(12) United States Patent
Hirokami

(10) Patent No.: US 10,995,106 B2
(45) Date of Patent: May 4, 2021

(54) COMPOSITION CONTAINING ORGANIC SILICON COMPOUND AND PAINT AND ADHESIVE CONTAINING SAID COMPOSITION

(71) Applicant: SHIN-ETSU CHEMICAL CO., LTD., Tokyo (JP)

(72) Inventor: Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 40 days.

(21) Appl. No.: 16/343,098

(22) PCT Filed: Nov. 2, 2017

(86) PCT No.: PCT/JP2017/039663
§ 371 (c)(1),
(2) Date: Apr. 18, 2019

(87) PCT Pub. No.: WO2018/092592
PCT Pub. Date: May 24, 2018

(65) Prior Publication Data
US 2020/0048284 A1 Feb. 13, 2020

(30) Foreign Application Priority Data

Nov. 21, 2016 (JP) .............................. JP2016-225934

(51) Int. Cl.
*C07F 7/18* (2006.01)
*C09D 7/40* (2018.01)
*C09J 11/06* (2006.01)

(52) U.S. Cl.
CPC .................. *C07F 7/18* (2013.01); *C09D 7/40* (2018.01); *C09J 11/06* (2013.01)

(58) Field of Classification Search
CPC ................ C08G 18/289; C08G 18/792; C08G 2150/20; C09D 167/00; C09D 7/40; C08K 5/5455; C07D 5/03; C09J 11/06
See application file for complete search history.

(56) References Cited

U.S. PATENT DOCUMENTS 5,266,657 A * 11/1993 Hammerton ......... C09D 167/00
525/437
5,932,678 A 8/1999 Meier et al.
(Continued)

FOREIGN PATENT DOCUMENTS

JP 9-255876 A 9/1997
JP 2001-115130 A 4/2001
(Continued)

OTHER PUBLICATIONS

Ni et al., Polymer 41 (2000) 57-71 (Year: 2000).*
(Continued)

*Primary Examiner* — Alexander R Pagano
(74) *Attorney, Agent, or Firm* — Birch, Stewart, Kolasch & Birch, LLP

(57) ABSTRACT

A composition according to the present invention contains 100 parts by mass of a component (A) and 1-200 parts by mass of a component (B) and is solid at 25° C., the solid form being achieved at 25° C. without spray drying, impregnation into wax, or the like, and said composition is useful as an additive for a paint composition and an adhesive composition. The component (A) is an organic silicon compound represented by general formula (1), and the component (B) is at least one of organic silicon compounds represented by general formulas (2) and (3)

$$(R^2O)_m\underset{R^1_{3-m}}{Si}\overset{}{\underset{H}{N}}\overset{O}{\underset{}{\overset{\|}{C}}}\overset{}{\underset{H}{N}}R^3\underset{O\overset{}{\underset{N}{\|}}}{\overset{\underset{N}{\|}}{\underset{}{N}}}\overset{O}{\underset{}{\overset{\|}{C}}}R^3\overset{}{\underset{H}{N}}\overset{O}{\underset{}{\overset{\|}{C}}}\overset{}{\underset{H}{N}}R^4\underset{R^1_{3-m}}{Si}(OR^2)_m \quad (1)$$

with $R^3\text{—NH—C(O)—N(H)—R^4—Si(OR^2)_m R^1_{3-m}}$ branch $$R^5\text{—}R^6\text{—}\underset{R^1_{3-m}}{Si}\text{—}(OR^2)_m \quad (2)$$

$$(R^2O)_m\text{—}\underset{R^1_{3-m}}{Si}\text{—}R^6\text{—}\underset{R^1_{3-m}}{Si}\text{—}(OR^2)_m \quad (3)$$

($R^1$ and $R^2$ represent, independently of each other, an alkyl group having 1-10 carbon atoms or the like, $R^3$ and $R^4$ represent, independently of each other, a divalent hydrocarbon group having 1-20 carbon atoms, m represents an integer from 1 to 3, $R^5$ represents an alkyl group having 1-10 carbon atoms or the like, and $R^6$ represents a divalent hydrocarbon group having 1-20 carbon atoms; however, an oxygen atom, a sulfur atom, etc., may be interposed between the aforementioned $R^5$ and $R^6$ and/or between carbon-carbon bonds in $R^6$, and a hydrogen atom in $R^6$ may be substituted by a halogen atom or the like.)

6 Claims, No Drawings

(56) References Cited

U.S. PATENT DOCUMENTS

| | | | |
|---|---|---|---|
| 6,288,198 B1* | 9/2001 | Mechtel | C08G 18/289 106/287.11 |
| 2004/0019141 A1 | 1/2004 | Bastelberger et al. | |
| 2005/0042462 A1* | 2/2005 | Fehn | C09D 183/04 428/447 |
| 2006/0194006 A1 | 8/2006 | Bacher et al. | |
| 2007/0015895 A1* | 1/2007 | Bernard | C07F 7/1804 528/44 |
| 2010/0216951 A1* | 8/2010 | Webster | C08F 283/006 525/452 |
| 2011/0105713 A1* | 5/2011 | Tanaka | C08G 77/20 528/32 |
| 2012/0315765 A1* | 12/2012 | Nakajima | C09D 183/08 438/694 |
| 2013/0186141 A1* | 7/2013 | Henry | C03C 17/30 65/30.14 |
| 2017/0009081 A1* | 1/2017 | Hirokami | C09D 5/03 |
| 2017/0369736 A1* | 12/2017 | Stache | C08G 18/718 |
| 2018/0312713 A1* | 11/2018 | Spyrou | C08L 75/04 |
| 2018/0334532 A1* | 11/2018 | Stache | C07F 7/1892 |
| 2019/0168255 A1* | 6/2019 | Tsuda | C09D 5/08 |

FOREIGN PATENT DOCUMENTS

| | | |
|---|---|---|
| JP | 2011-105779 A | 6/2011 |
| JP | 2015-229738 A | 12/2015 |
| JP | 2016-6200 A | 1/2016 |
| JP | 2016-89093 A | 5/2016 |
| JP | 2017-14457 A | 1/2017 |
| WO | WO 2004/098898 A1 | 11/2004 |
| WO | WO 2011/124677 A1 | 10/2011 |

OTHER PUBLICATIONS

PCT/JP2017/039663 Written Opinion of the International Searching Authority (dated 2018) (Year: 2018).*

H. Ni et al, 38 Progress in Organic Coatings, 97-110 (2000) (Year: 2000).*

H. Ni et al., 201 Macromol. Chem. Phys., 722-732 (2000) (Year: 2000).*

Z. Pu et al., 11 Journal of Adhesion Science and Technology, 29-47 (1997) (Year: 1997).*

International Search Report for PCT/JP2017/039663 dated Jan. 16, 2018.

Ni et al., "Alkoxysilane-modified Polyurea Coatings", Polymeric materials science and engineering, 1999, vol. 81, pp. 405-406.

Ni et al., "Siloxane Functionalized Isocyanurate Coatings", Polymer Preprints, 1998, vol. 39, No. 1, pp. 367-368.

Written Opinion of the International Searching Authority for PCT/JP2017/039663 (PCT/ISA/237) dated Jan. 16, 2018.

* cited by examiner

COMPOSITION CONTAINING ORGANIC SILICON COMPOUND AND PAINT AND ADHESIVE CONTAINING SAID COMPOSITION

TECHNICAL FIELD

This invention relates to a composition containing an organosilicon compound. More particularly, it relates to a composition which contains a specific organosilicon compound and is solid at normal temperature.

BACKGROUND ART

Since organosilicon compounds having a hydrolyzable silyl group (silane coupling agent) function to couple organic materials with inorganic materials, they are used in a wide variety of fields for such purposes as an increase in mechanical strength of composite materials, adhesion improvement, resin modification, and surface modification.

Since general-purpose organosilicon compounds are liquid, there are problems that they cannot be used unless liquid handling equipment are furnished and that solid materials become sticky when the organosilicon compounds are added thereto. Thus, an organosilicon compound which is solid at normal temperature is required.

From this viewpoint, solid organosilicon compounds have been studied (see Patent Documents 1 to 3, for example).

However, the techniques of Patent Documents 1 and 2 involve preparing a polymer solution of an organosilicon compound and spray drying the solution for solidification, during which the organosilicon compound can be hydrolyzed and condensed.

The technique of Patent Document 3 achieves solidification by impregnating a wax or similar component with an organosilicon compound. The technique fails to prepare a composition having an organosilicon compound content close to 100%. In addition to this problem, the wax component used may have an adverse impact on another composition with which the organosilicon compound is to be blended.

PRIOR ART DOCUMENTS

Patent Documents

Patent Document 1: WO 2004/098898
Patent Document 2: US 20040019141
Patent Document 3: JP-A 2016-006200

SUMMARY OF INVENTION

Technical Problem

An object of the invention, which has been made under the above circumstances, is to provide a composition comprising an organosilicon compound, which is solid at 25° C. without a need for spray drying, wax impregnation or the like, and useful as an additive to coating and adhesive compositions.

Solution to Problem

Making extensive investigation to attain the above object, the inventor has found that a composition containing an organosilicon compound having an isocyanurate backbone and another organosilicon compound in a predetermined ratio is solid at 25° C., and that when this solid composition is added to a coating or adhesive composition, the resulting coating is improved in adhesion and bond strength. The present invention is predicated on this finding.

The invention is defined below.

1. A composition comprising 100 parts by weight of component (A) and 1 to 200 parts by weight of component (B), the composition being solid at 25° C., (A) an organosilicon compound having the general formula (1):

[Chem. 1]

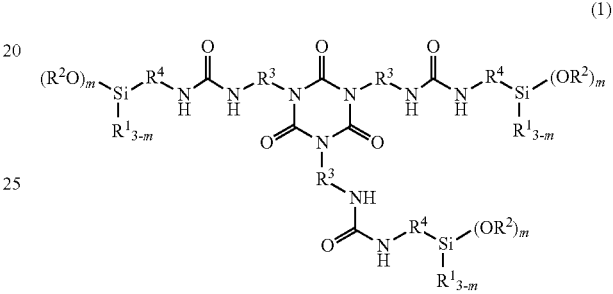
(1)

wherein $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ is each independently a $C_1$-$C_{20}$ divalent hydrocarbon group, $R^4$ is each independently a $C_1$-$C_{20}$ divalent hydrocarbon group, and m is an integer of 1 to 3, and (B) at least one compound selected from organosilicon compounds having the general formulae (2) and (3):

[Chem. 2]

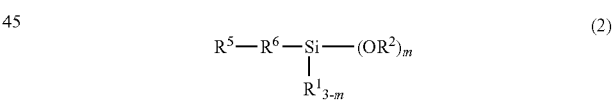
(2)

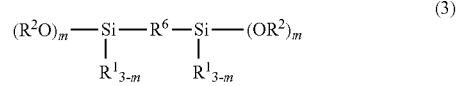
(3)

wherein $R^5$ is a $C_1$-$C_{10}$ alkyl, $C_1$-$C_{10}$ halogenated alkyl, $C_6$-$C_{20}$ aryl, amino, epoxy, (meth)acrylic, hydroxyl, mercapto, isocyanate, imidazole, or benzotriazole group, $R^6$ is a $C_1$-$C_{20}$ divalent hydrocarbon group, wherein at least moiety selected from an oxygen atom, sulfur atom, nitrogen atom, carbonyl bond, ester bond, imino bond, amide bond, urea bond, and urethane bond may intervene between $R^5$ and $R^6$ and/or in a carbon-carbon bond in $R^6$, and a hydrogen atom in $R^6$ may be substituted by a halogen atom or a substituent group containing group $R^5$, and $R^1$, $R^2$ and m are as defined above.

2. The composition of 1 wherein component (A) is an organosilicon compound having the general formula (4):

[Chem. 3]

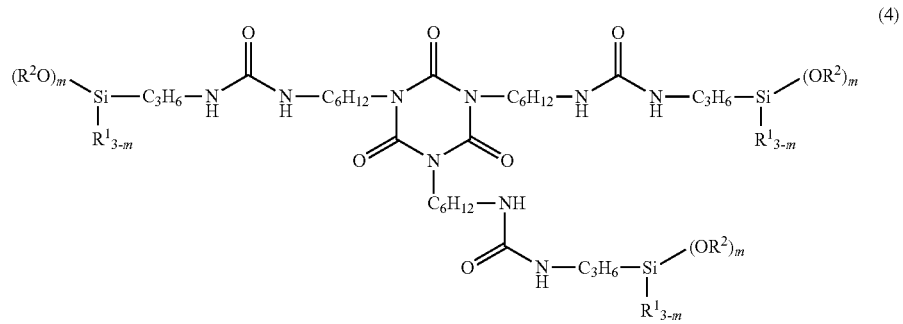

(4)

wherein $R^1$, $R^2$, and m are as defined above.
3. The composition of 1 or 2 wherein component (B) is present in an amount of 1 to 100 parts by weight.
4. The composition of any one of 1 to 3, having a melting point of at least 40° C.
5. A coating composition comprising the composition of any one of 1 to 4.
6. An adhesive comprising the composition of any one of 1 to 4.

Advantageous Effects of Invention

The organosilicon compound-containing composition of the invention, which is solid at 25° C., has the advantage of ease of mixing with solid resins.
When the inventive composition is blended in a coating or adhesive composition, the adhesion of a coating to a substrate and the bond between adherends are improved.

DESCRIPTION OF EMBODIMENTS

Now the invention is described in detail.
The invention provides a composition comprising 100 parts by weight of component (A) and 1 to 200 parts by weight of component (B), the composition being solid at 25° C.,
(A) an organosilicon compound having the general formula (1) and
(B) at least one compound selected from organosilicon compounds having the general formulae (2) and (3), all shown below.

[Chem. 4]

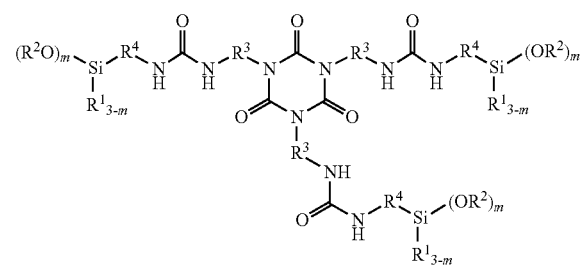

(1)

-continued

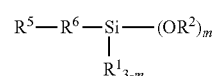

(2)

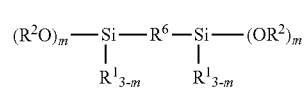

(3)

Herein, $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ is each independently a $C_1$-$C_{20}$ divalent hydrocarbon group, $R^4$ is each independently a $C_1$-$C_{20}$ divalent hydrocarbon group, m is an integer of 1 to 3, $R^5$ is a $C_1$-$C_{10}$ alkyl, $C_1$-$C_{10}$ halogenated alkyl, $C_6$-$C_{20}$ aryl, amino, epoxy, (meth)acrylic, hydroxyl, mercapto, isocyanate, imidazole, or benzotriazole group, and $R^6$ is a $C_1$-$C_{20}$ divalent hydrocarbon group, in which at least one moiety selected from an oxygen atom, sulfur atom, nitrogen atom, carbonyl bond, ester bond, imino bond, amide bond, urea bond, and urethane bond may intervene between $R^5$ and $R^6$ and/or in a carbon-carbon bond in $R^6$, and a hydrogen atom in $R^6$ may be substituted by halogen or a substituent group containing group $R^5$.

The $C_1$-$C_{10}$ alkyl group may be linear, cyclic, or branched. Examples include methyl, ethyl, n-propyl, i-propyl, n-butyl, s-butyl, t-butyl, n-pentyl, n-hexyl, n-heptyl, n-octyl, n-nonyl, n-decyl, cyclopropyl, cyclobutyl, cyclopentyl, cyclohexyl, cycloheptyl, and cyclooctyl.

Examples of the $C_1$-$C_{10}$ halogenated alkyl group include the above $C_1$-$C_{10}$ alkyl groups in which at least one hydrogen atom is substituted by halogen such as fluorine, chlorine, bromine or iodine.

Examples of the $C_6$-$C_{10}$ aryl group include phenyl, α-naphthyl, and β-naphthyl.

The $C_1$-$C_{20}$ divalent hydrocarbon group may be linear, cyclic, or branched. Examples include alkylene groups such as methylene, ethylene, trimethylene, propylene, isopropylene, tetramethylene, isobutylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, octadecamethylene, nonadecamethylene, and eicosadecylene; cycloalkylene groups such as cyclopentylene and cyclohexylene; and arylene groups such as phenylene, α- and β-naphthylene.

Inter alia, $R^1$ and $R^2$ in formulae (1) to (3) are preferably methyl, ethyl, n-propyl, n-butyl, and phenyl, with methyl and ethyl being more preferred.

$R^3$ and $R^4$ are preferably methylene, ethylene, trimethylene, tetramethylene, pentamethylene, hexamethylene, octamethylene, and decamethylene. More preferably, $R^3$ is hexamethylene, and $R^4$ is trimethylene.

The organosilicon compound having formula (1) used as component (A) is preferably an organosilicon compound having the general formula (4) below, more preferably an organosilicon compound of formula (4) wherein m=3, and even more preferably, an organosilicon compound having the formula (5) or (6) below.

lane, dimethyldimethoxysilane, dimethyldiethoxysilane, n-propyltrimethoxysilane, n-propyltriethoxysilane, n-hexyltrimethoxysilane, n-hexyltriethoxysilane, n-octyltrimethoxysilane, n-octyltriethoxysilane, n-decyltrimethoxysilane, 1,6-bis(trimethoxysilyl)hexane, and 1,8-bis(trimethoxysilyl)octane.

Examples of the organosilicon compound having a halogenated alkyl group include the above-exemplified organosilicon compounds having an alkyl group in which some or all hydrogen atoms in the silicon-bonded alkyl group are substituted by halogen such as chlorine or fluorine.

[Chem. 5]

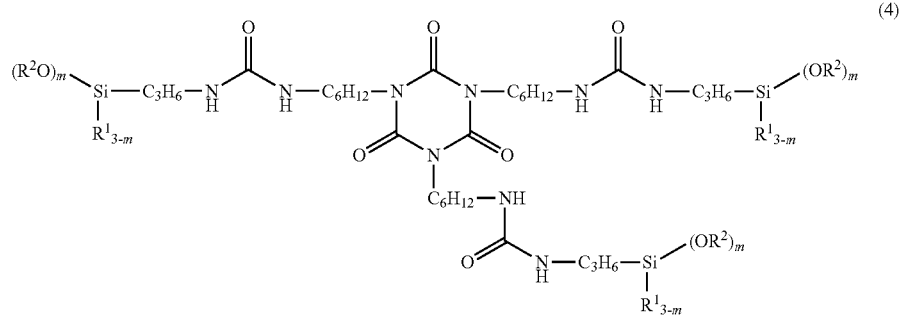

Herein $R^1$, $R^2$, and m are as defined above.

[Chem. 6]

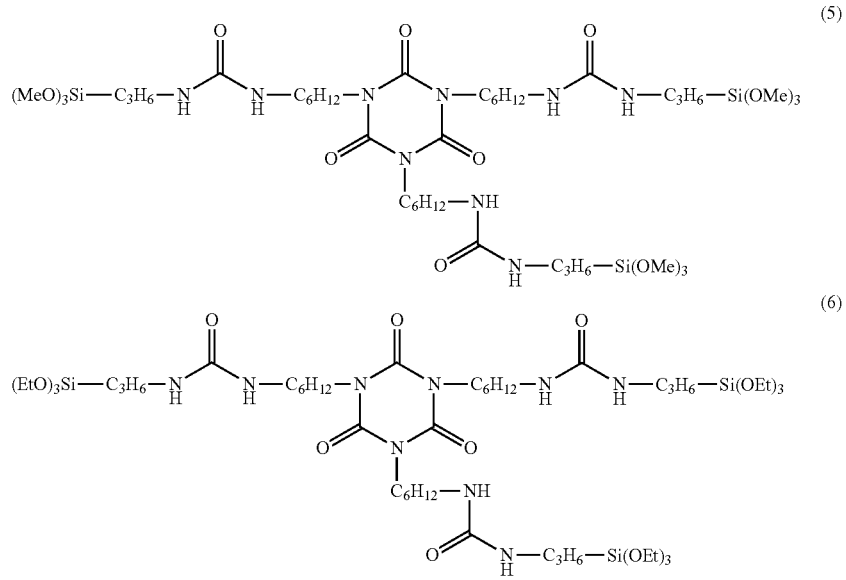

Herein Me stands for methyl, and Et for ethyl.

On the other hand, examples of the organosilicon compound having formula (2) or (3) used as component (B) include the compounds shown below, but are not limited thereto.

Examples of the organosilicon compound having an alkyl group include methyltrimethoxysilane, methyltriethoxysi- Examples of the organosilicon compound having an aryl group include phenyltrimethoxysilane, phenyltriethoxysilane, methylphenyldimethoxysilane, and methylphenyldiethoxysilane.

Examples of the organosilicon compound having an amino group include α-aminomethyltrimethoxysilane, α-aminomethylmethyldimethoxysilane, α-aminomethyldimethylmethoxysilane, α-aminomethyltriethoxysilane, α-aminomethylmethyldiethoxysilane, α-aminomethyldimethylethoxysilane, γ-aminopropyltrimethoxysilane, γ-aminopropylmethyldimethoxysilane, γ-aminopropyldimethylmethoxysilane, γ-aminopropyltriethoxysilane, γ-aminopropylmethyldiethoxysilane, γ-aminopropyldimethylethoxysilane, N-(2-aminoethyl)-α-aminomethyltrimethoxysilane, N-(2-aminoethyl)-α-aminomethylmethyldimethoxysilane, N-(2-aminoethyl)-α-aminomethyldimethylmethoxysilane, N-(2-aminoethyl)-α-aminomethyltriethoxysilane, N-(2-aminoethyl)-α-aminomethylmethyldiethoxysilane, N-(2-aminoethyl)-α-aminomethyldimethylethoxysilane, bis(trimethoxysilylpropyl)amine, bis(methyldimethoxysilylpropyl)amine, bis(dimethylmethoxysilylpropyl)amine, bis(triethoxysilylpropyl)amine, bis(methyldiethoxysilylpropyl)amine, and bis(dimethylethoxysilylpropyl)amine.

Examples of the organosilicon compound having an epoxy group include γ-glycidoxypropyltrimethoxysilane, γ-glycidoxypropyltriethoxysilane, γ-glycidoxypropyldimethoxymethylsilane, γ-glycidoxypropyldiethoxymethylsilane, γ-glycidoxypropylethoxydimethylsilane, 8-glycidoxyoctyltrimethoxysilane, β-(3,4-epoxycyclohexyl)ethyltrimethoxysilane, β-(3,4-epoxycyclohexyl)ethyltriethoxysilane, and 5,6-epoxyhexyltriethoxysilane.

Examples of the organosilicon compound having a (meth)acrylic group include γ-methacryloxypropyltrimethoxysilane, γ-methacryloxypropyltriethoxysilane, γ-methacryloxypropyldiethoxymethylsilane, γ-methacryloxypropylethoxydimethylsilane, γ-methacryloxypropylmethoxydimethylsilane, γ-methacryloxypropyldimethoxymethylsilane, 8-methacryloxyoctyltrimethoxysilane, γ-acryloxypropyltrimethoxysilane, γ-acryloxypropyldimethoxymethylsilane, α-methacryloxypropyltrimethoxysilane, and α-methacryloxypropyltriethoxysilane.

Examples of the organosilicon compound having a mercapto group include mercaptomethyltrimethoxysilane, mercaptomethylmethyldimethoxysilane, mercaptomethyldimethylmethoxysilane, mercaptomethyltriethoxysilane, mercaptomethylmethyldiethoxysilane, mercaptomethyldimethylethoxysilane, γ-mercaptopropyltrimethoxysilane, γ-mercaptopropylmethyldimethoxysilane, γ-mercaptopropyldimethylmethoxysilane, γ-mercaptopropyltriethoxysilane, γ-mercaptopropylmethyldiethoxysilane, and γ-mercaptopropyldimethylethoxysilane.

Examples of the organosilicon compound having an isocyanate group include γ-isocyanatopropyltrimethoxysilane, γ-isocyanatopropyltriethoxysilane, γ-isocyanatopropylmethyldimethoxysilane, and γ-isocyanatopropylmethyldiethoxysilane.

Examples of the organosilicon compound having a urea group include γ-ureidopropyltrimethoxysilane and γ-ureidopropyltriethoxysilane.

Examples of the organosilicon compound having a polysulfide group include bis(trimethoxysilylpropyl)tetrasulfide, bis(triethoxysilylpropyl)tetrasulfide, bis(trimethoxysilylpropyl)disulfide, and bis(triethoxysilylpropyl)disulfide.

The organosilicon compound having an imidazole group is not particularly limited as long as it is an organosilicon compound having an imidazole group and a hydrolyzable silyl group in the molecule. Examples include organosilicon compounds represented by the following formulae (7) to (9), with those compounds wherein m=3 and $R^2$ is methyl or ethyl being preferred.

[Chem. 7]

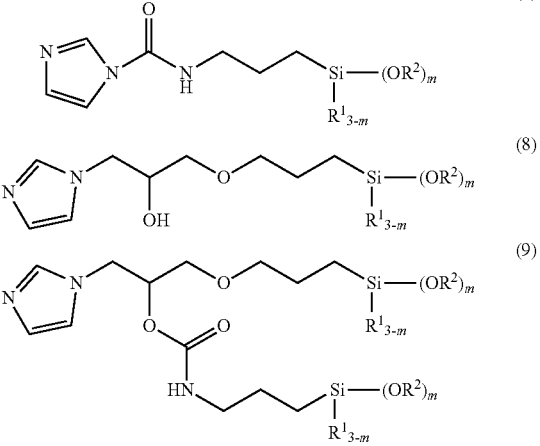

Herein $R^1$, $R^2$, and m are as defined above.

The organosilicon compound having a benzotriazole group is not particularly limited as long as it is an organosilicon compound having a benzotriazole group and a hydrolyzable silyl group in the molecule. Examples include organosilicon compounds represented by the following formulae (10) to (12), with those compounds wherein m=3 and $R^2$ is methyl or ethyl being preferred.

[Chem. 8]

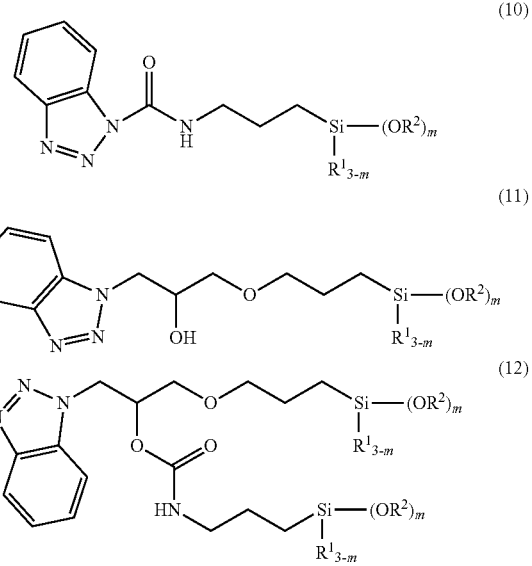

Herein $R^1$, $R^2$, and m are as defined above.

Among the above-described examples of component (B), preference is given to octyltriethoxysilane, γ-aminopropyltriethoxysilane, N-(2-aminoethyl)-3-aminopropyltrimethoxysilane, γ-glycidoxypropyltrimethoxysilane, γ-methacryloxypropyltrimethoxysilane, γ-mercaptopropyltrimethoxysilane, γ-ureidopropyltrimethoxysilane, bis(triethoxysilylpropyl)tetrasulfide, an organosilicon compound having an imidazole group represented by the following formula (13), and an organosilicon compound having a benzotriazole group represented by the following formula (14).

The compounds of component (B) may be used alone or in combination of two or more.

[Chem. 9]

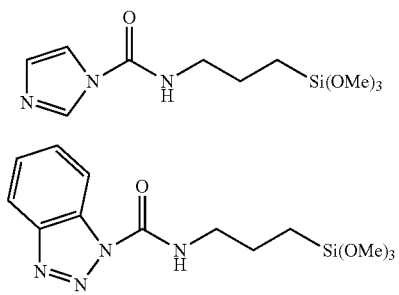

Herein Me stands for methyl.

As described above, components (A) and (B) are mixed in the inventive composition such that 1 to 200 parts by weight of component (B) is present per 100 parts by weight of component (A). If the amount of component (B) compounded exceeds 200 parts by weight, the composition is not solid at 25° C. and difficult to handle. If the amount is less than 1 part by weight, an adhesion improving effect becomes insufficient when the composition is added to a coating or adhesive composition.

In particular, in order that the composition be solid at 25° C., have a higher melting point, and exert a sufficient adhesion improving effect, the amount of component (B) compounded is preferably 1 to 100 parts by weight, more preferably 5 to 50 parts by weight, and even more preferably 7 to 30 parts by weight per 100 parts by weight of component (A).

The composition of the invention preferably has a melting point of at least 40° C., and more preferably at least 60° C. If the melting point is lower than 40° C., handling may be difficult. Notably, the melting point of the composition may be measured using a differential scanning calorimeter (DSC).

The method for preparing the composition of the invention is not particularly limited. The composition may be prepared by mixing components (A) and (B) in any desired order. Since component (A) is typically solid, preferably the composition is prepared by heating component (A) at a temperature at which component (A) is melted, agitating and mixing components (A) and (B), and cooling the mixture to near room temperature (25° C.).

By adding the inventive composition to a coating composition, the coating composition is improved in adhesion.

The coating composition which can be used herein is not particularly limited. Since the organosilicon compound-containing composition of the invention is solid, it may be added to a powder coating composition. In this application, an improvement in handling is particularly expectable, and an improvement in adhesion to substrates is also expectable. Thus, the inventive composition is an effective additive to a powder coating composition.

The resin in the powder coating composition may be suitably selected from conventional resins commonly used in powder coating compositions. Examples include epoxy resins, polyester resins, epoxy polyester resins, acrylic resins, fluoro-resins, and silicone resins.

The amount of the inventive composition blended in the coating composition is not particularly limited. In view of a balance between the addition amount and the adhesion improving effect, the amount of the inventive composition added is preferably 0.01 to 20% by weight, and more preferably 0.1 to 5% by weight of the overall coating composition.

To the coating composition of the invention, any appropriate additives for powder coating compositions, such as fillers, coloring pigments, glitters, flow modifiers, aesthetic polymer microparticles, surface modifiers, cure accelerators, and lubricants may be added, if necessary.

The substrate which is coated with the coating composition of the invention may be selected from various prior art well-known substrates. Examples include metal substrates of steel, zinc, aluminum, copper, and tin, surface treated substrates (i.e., the foregoing metal substrates which have been surface treated), and undercoated substrates (i.e., the foregoing metal substrates which have been coated with primer or undercoat).

The composition finds application in a variety of fields including vehicle members, household electric appliances, building members, road members, and business machines.

In another embodiment, the organosilicon compound-containing composition of the invention is blended in an adhesive composition, whereby the adhesive composition is improved in bond and adhesion.

The resin used in the adhesive composition may be selected from conventional resins commonly used in adhesive compositions. Examples include natural polymer materials such as proteins, nucleic acids, lipids, polysaccharides, and natural rubber; and synthetic polymer materials such as phenolic resins, epoxy resins, melamine resins, urea resins, polyurethane, polyimide, polyamide-imide, polyethylene, polypropylene, polyvinyl chloride, polystyrene, polyvinyl acetate, acrylic resins, nitrile resins, isoprene resins, urethane resins, ethylene propylene resins, epichlorohydrin resins, chloroprene resins, butadiene resins, styrene-butadiene resins, polyamide, polyacetal, polycarbonate, polyphenylene ether, polyethylene terephthalate, polybutylene terephthalate, cyclic polyolefin, polyphenylene sulfide, polytetrafluoroethylene, polysulfone, polyether sulfone, and polyether ether ketone. Copolymers and polymer alloys thereof may also be used.

The amount of the inventive composition blended in the adhesive composition is not particularly limited. In view of a balance between the addition amount and the adhesion improving effect, the amount of the composition is preferably 0.01 to 20% by weight, and more preferably 0.1 to 5% by weight of the overall adhesive composition.

To the adhesive composition of the invention, any appropriate additives such as surfactants, preservatives, anti-discoloration agents, and antioxidants may be added, if necessary.

EXAMPLES

Synthesis Examples, Examples, and Comparative Examples are given below by way of illustration and not by way of limitation. In the following Examples, $^1$H-NMR is analyzed by AVANCE 400M (Bruker). Me stands for methyl, and Et stands for ethyl.

[1] Synthesis of Organosilicon Compounds

[Synthesis Example 1] Synthesis of Organosilicon Compound (A)-1

A 1-L separable flask equipped with a stirrer, reflux condenser, dropping funnel, and thermometer was charged with 91.3 g of a nurate-form of hexamethylene diisocyanate (TPA-100 by Asahi Chemical Industry Co., Ltd.) and 200 g of toluene. At an internal temperature of 100 to 110° C., 89.7 g (0.5 mol) of 3-aminopropyltrimethoxysilane (KBM-903 by Shin-Etsu Chemical Co., Ltd.) was added dropwise thereto over 10 minutes. Stirring was continued at 110° C. for 1 hour. Subsequent stripping yielded an organosilicon compound having a melting point of 120° C. On analysis by $^1$H-NMR spectroscopy, the reaction product was identified to be a compound of the structure having the following formula (5). This organosilicon compound is designated (A)-1.

[Chem. 10]

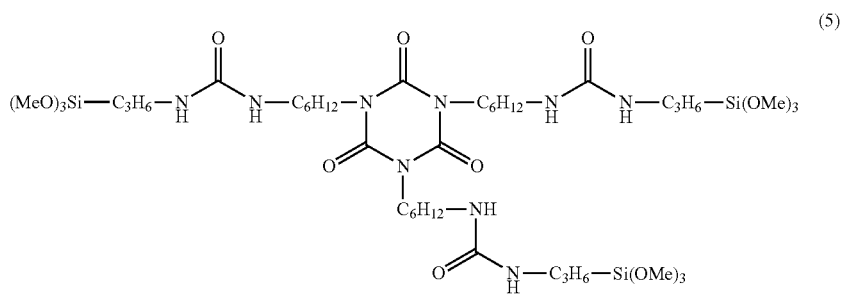

(5)

for 1 hour. Subsequent stripping yielded an organosilicon compound having a melting point of 115° C. On analysis by $^1$H-NMR spectroscopy, the reaction product was identified to be a compound of the structure having the following formula (6). This organosilicon compound is designated (A)-2.

[Chem. 11]

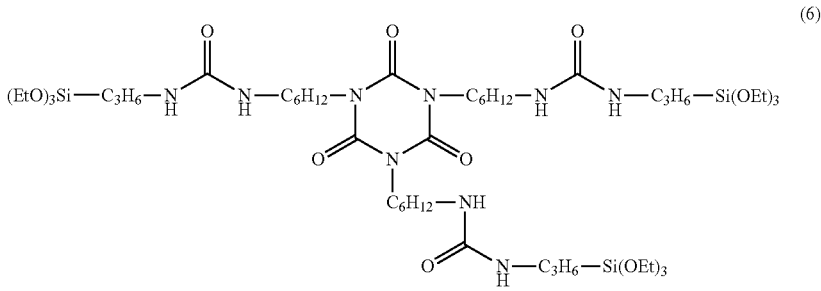

(6)

[Synthesis Example 2] Synthesis of Organosilicon Compound (A)-2

A 1-L separable flask equipped with a stirrer, reflux condenser, dropping funnel, and thermometer was charged with 91.3 g of a nurate-form of hexamethylene diisocyanate (TPA-100 by Asahi Chemical Industry Co., Ltd.) and 200 g of toluene. At an internal temperature of 100 to 110° C., 110.7 g (0.5 mol) of 3-aminopropyltriethoxysilane (KBE-903 by Shin-Etsu Chemical Co., Ltd.) was added dropwise thereto over 10 minutes. Stirring was continued at 110° C.

[2] Preparation of Organosilicon Compound-Containing Compositions

Example 1-1

In a 1 L-separable flask equipped with a stirrer and thermometer, 100 g of Organosilicon Compound A-(1) as component (A) and 10 g of octyltriethoxysilane (KBE-3083 by Shin-Etsu Chemical Co., Ltd., designated (B)-1, hereinafter) as component (B) were metered. The internal temperature was raised to 140° C. until Compound A-(1) was completely melted. Subsequently, the mixture was cooled, yielding a composition having a melting temperature of 101° C. and being solid at 25° C. This composition is designated (I). The melting point was measured using a differential scanning calorimeter (DSC) (the same applies hereinafter).

Example 1-2

The same procedure as in Example 1-1 was repeated except that Organosilicon Compound A-(2) was used instead of Organosilicon Compound A-(1), obtaining a composition which was solid at 25° C. This composition is designated (II).

Example 1-3

The same procedure as in Example 1-2 was repeated except that the amount of Organosilicon Compound B-(1) was changed to 20 g, obtaining a composition which was solid at 25° C. This composition is designated (III).

Examples 1-4 to 1-12

The same procedure as in Example 1-2 was repeated except that Organosilicon Compounds (B)-2 to (B)-10 as shown below were used instead of Organosilicon Compound B-(1), obtaining compositions which were solid at 25° C. These compositions are designated (IV) to (XII).

(B)-2: 3-aminopropyltriethoxysilane (KBE-903 by Shin-Etsu Chemical Co., Ltd.)

(B)-3: N-(2-aminoethyl)-3-aminopropyltrimethoxysilane (KBM-603 by Shin-Etsu Chemical Co., Ltd.)

(B)-4: 3-glycidoxypropyltrimethoxysilane (KBM-403 by Shin-Etsu Chemical Co., Ltd.)

(B)-5: 3-methacryloxypropyltrimethoxysilane (KBM-503 by Shin-Etsu Chemical Co., Ltd.)

(B)-6: 3-mercaptopropyltrimethoxysilane (KBM-803 by Shin-Etsu Chemical Co., Ltd.)

(B)-7: 3-ureidopropyltrimethoxysilane (KBM-585 by Shin-Etsu Chemical Co., Ltd.)

(B)-8: bis(triethoxysilylpropyl)tetrasulfide (KBE-846 by Shin-Etsu Chemical Co., Ltd.)

(B)-9: the reaction product of 3-isocyanatopropyltrimethoxysilane and imidazole, represented by the following formula (13)

(B)-10: the reaction product of 3-isocyanatopropyltrimethoxysilane and benzotriazole, represented by the following formula (14)

[Chem. 12]

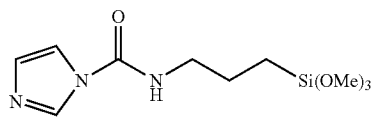

(13)

-continued

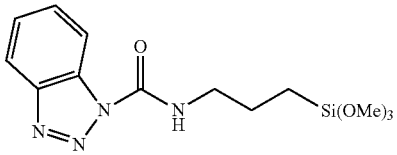

(14)

The compositions of Examples 1-1 to 1-12 are summarized in Table 1 together with their melting point.

TABLE 1

| | Composition | Organosilicon compound (A) (pbw) | Organosilicon compound (B) (pbw) | State at 25° C. | Melting point (° C.) |
|---|---|---|---|---|---|
| Example 1-1 | I | (A)-1 (100) | (B)-1 (10) | solid | 101 |
| Example 1-2 | II | (A)-2 (100) | (B)-1 (10) | solid | 98 |
| Example 1-3 | III | (A)-2 (100) | (B)-1 (20) | solid | 82 |
| Example 1-4 | IV | (A)-2 (100) | (B)-2 (10) | solid | 98 |
| Example 1-5 | V | (A)-2 (100) | (B)-3 (10) | solid | 98 |
| Example 1-6 | VI | (A)-2 (100) | (B)-4 (10) | solid | 98 |
| Example 1-7 | VII | (A)-2 (100) | (B)-5 (10) | solid | 98 |
| Example 1-8 | VIII | (A)-2 (100) | (B)-6 (10) | solid | 98 |
| Example 1-9 | IX | (A)-2 (100) | (B)-7 (10) | solid | 98 |
| Example 1-10 | X | (A)-2 (100) | (B)-8 (10) | solid | 98 |
| Example 1-11 | XI | (A)-2 (100) | (B)-9 (10) | solid | 98 |
| Example 1-12 | XII | (A)-2 (100) | (B)-10 (10) | solid | 98 |

[3] Preparation of Coating Compositions

Examples 2-1 to 2-8 and Comparative Examples 2-1 and 2-2

A powder coating composition of the formulation (pbw) shown in Table 2 was admitted into a mixer (trade name High-Speed Mixer by Fukae Industry Co., Ltd., volume 2 L), where the contents were uniformly mixed for 1 minute by rotating the agitator at 500 rpm and the chopper at 4,000 rpm. The mixture was melt kneaded on an extruder/kneader (trade name Buss Ko-Kneader PR46 by Buss) at a temperature of 80 to 120° C. The mass was cooled, finely ground on a hammer mill and sieved through a 200-mesh screen, obtaining a powder coating composition having an average particle size of 35 μm.

TABLE 2

| Formulation (pbw) | Example | | | | | | | | Comparative Example | |
|---|---|---|---|---|---|---|---|---|---|---|
| | 2-1 | 2-2 | 2-3 | 2-4 | 2-5 | 2-6 | 2-7 | 2-8 | 2-1 | 2-2 |
| Polyester resin 1 | 65 | 65 | 65 | 65 | 65 | 65 | 65 | 65 | 65 | 65 |
| Composition II | 3 | | | | | | | | | |
| Composition IV | | 3 | | | | | | | | |
| Composition V | | | 3 | | | | | | | |
| Composition VI | | | | 3 | | | | | | |
| Composition VII | | | | | 3 | | | | | |
| Composition VIII | | | | | | 3 | | | | |
| Composition XI | | | | | | | 3 | | | |
| Composition XII | | | | | | | | 3 | | |
| Organosilicon Compound (A)-2 | | | | | | | | | | 3 |
| Curing agent | 5 | 5 | 5 | 5 | 5 | 5 | 5 | 5 | 5 | 5 |
| Benzoin | 0.2 | 0.2 | 0.2 | 0.2 | 0.2 | 0.2 | 0.2 | 0.2 | 0.2 | 0.2 |
| Titanium oxide | 30 | 30 | 30 | 30 | 30 | 30 | 30 | 30 | 30 | 30 |
| Leveling agent | 0.5 | 0.5 | 0.5 | 0.5 | 0.5 | 0.5 | 0.5 | 0.5 | 0.5 | 0.5 |

The components shown in Table 2 are described below.
Polyester resin 1: M-8961 (DIC Corp., carboxyl-containing polyester resin)
Curing agent: PRIMID XL-552 (EMS Griltech, β-hydroxyalkylamide)
Titanium oxide: JA-1 (TAYCA Corp.)
Leveling agent: Resiflow P-67 (ESTRON CHEMICAL)

Using an electrostatic coating machine (trade name PG-1 by Matsuo Sangyo Co., Ltd.), each of the powder coating compositions in Examples 2-1 to 2-8 and Comparative Examples 2-1 and 2-2 was electrostatic powder coated onto a substrate (SPCC steel plate of 0.8 mm thick treated with zinc phosphate Parbond #3118 by Nihon Parkerizing Co., Ltd.) in such a coating weight as to give a cured thickness of 60 μm, and baked and dried under such conditions as to keep the substrate temperature at 150° C. for 20 minutes, completing a test sample. The test samples were examined for the following coating properties. The results are shown in Table 3.

(1) Gloss (60° G)
   measured according to JIS K-5600 4.7 (reflection 600)
(2) Impact Test
   According to JIS K-5400 8.3.2 Dupont impact test, an impact was applied to the coated surface and back surface of the coated plate under conditions including a drop weight of 1,000 g, an impact tip diameter of ½ inch, and a dropping height of 50 cm. Pressure-sensitive adhesive tape (cellophane tape) was attached to the impacted area and instantly pulled back. It was examined how the coating was stripped and rated according to the following criterion.

○: no stripping of coating observed
Δ: some stripping of coating observed
x: noticeable stripping of coating observed (3) Cross-Hatch Adhesion
   measured according to JIS K-5600 5.6
(4) Boiling Water Resistance (Outer Appearance)
   The test sample was immersed in boiling water for 5 hours before the coating was visually inspected for outer appearance and rated according to the following criterion.
   ○: gloss maintained
   Δ: a lowering of gloss, matting
   x: a substantial loss of gloss
(5) Boiling Water Resistance (Cross-Hatch Adhesion)
   The test sample was immersed in boiling water for 5 hours before it was evaluated according to JIS K-5600 5.6.
(6) Moisture Resistance (Outer Appearance)
   The test sample was subjected to 1,000-hour continuous test according to JIS K-5400 9.2.2 before it was visually inspected and rated according to the following criterion.
   ○: gloss maintained
   Δ: a lowering of gloss, matting
   x: a substantial loss of gloss
(7) Moisture Resistance (Cross-Hatch Adhesion)
   The test sample was subjected to 1,000-hour continuous test according to JIS K-5400 9.2.2 before it was evaluated according to JIS K-5600 5.6.
(8) Salt Water Spraying (Cut Stripping)
   The test sample was cross-cut on its coated surface and subjected to 500-hour continuous testing according to JIS K-5400 9.2. Adhesive tape was attached to the cut area and pulled back. Stripping distance is the maximum of width of a stripped portion of coating from the center line between cut lines.

TABLE 3

| | Example | | | | | | | | Comparative Example | |
|---|---|---|---|---|---|---|---|---|---|---|
| | 2-1 | 2-2 | 2-3 | 2-4 | 2-5 | 2-6 | 2-7 | 2-8 | 2-1 | 2-2 |
| Gloss (60° G) | 94 | 95 | 95 | 95 | 94 | 95 | 95 | 94 | 95 | 94 |
| Impact test | ○ | ○ | ○ | ○ | ○ | ○ | ○ | ○ | ○ | ○ |
| Cross-hatch adhesion | 100/100 | 100/100 | 100/100 | 100/100 | 100/100 | 100/100 | 100/100 | 100/100 | 100/100 | 100/100 |
| Boiling water resistance (outer appearance) | ○ | ○ | ○ | ○ | ○ | ○ | ○ | ○ | X | Δ |
| Boiling water resistance (cross-hatch adhesion) | 100/100 | 100/100 | 100/100 | 100/100 | 100/100 | 100/100 | 100/100 | 100/100 | 30/100 | 80/100 |

TABLE 3-continued

|  | Example | | | | | | | | Comparative Example | |
|---|---|---|---|---|---|---|---|---|---|---|
|  | 2-1 | 2-2 | 2-3 | 2-4 | 2-5 | 2-6 | 2-7 | 2-8 | 2-1 | 2-2 |
| Moisture resistance (outer appearance) | ◯ | ◯ | ◯ | ◯ | ◯ | ◯ | ◯ | ◯ | X | Δ |
| Moisture resistance (cross-hatch adhesion) | 100/100 | 100/100 | 100/100 | 100/100 | 100/100 | 100/100 | 100/100 | 100/100 | 20/100 | 60/100 |
| Salt water spraying (cut stripping) | 2.6 mm | 2.2 mm | 2.2 mm | 2.3 mm | 2.2 mm | 2.2 mm | 2.2 mm | 2.3 mm | 4.2 mm | 3.5 mm |

As shown in Table 3, the coatings obtained from the powder coating compositions of Examples 2-1 to 2-8 having added thereto an organosilicon compound-containing composition within the scope of the invention are improved in adhesion under various watery conditions over the coatings obtained from the powder coating compositions of Comparative Examples 2-1 and 2-2 which are free of the inventive composition.

The invention claimed is:

1. A composition comprising 100 parts by weight of component (A) and 1 to 200 parts by weight of component (B), the composition being solid at 25° C., (A) an organosilicon compound having the general formula (1):

[Chem. 1]

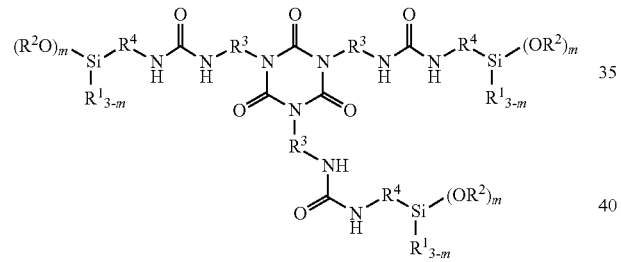

wherein $R^1$ is each independently a $C_1$-$C_{10}$ alkyl or $C_6$-$C_{10}$ aryl group, $R^2$ is each independently a $C_1$-$C_{10}$ alkyl or $C_6$-$C_{10}$ aryl group, $R^3$ is each independently a $C_1$-$C_{20}$ divalent hydrocarbon group, $R^4$ is each independently a $C_1$-$C_{20}$ divalent hydrocarbon group, and m is an integer of 1 to 3, and (B) at least one compound selected from organosilicon compounds having the general formulae (2) and (3):

[Chem. 2]

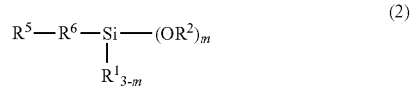

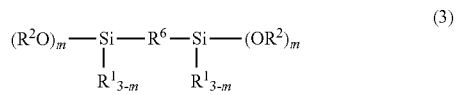

wherein $R^5$ is a $C_1$-$C_{10}$ alkyl, $C_1$-$C_{10}$ halogenated alkyl, $C_6$-$C_{20}$ aryl, amino, epoxy, (meth)acrylic, hydroxyl, mercapto, isocyanate, imidazole, or benzotriazole group, $R^6$ is a $C_1$-$C_{20}$ divalent hydrocarbon group, wherein at least moiety selected from an oxygen atom, sulfur atom, nitrogen atom, carbonyl bond, ester bond, imino bond, amide bond, urea bond, and urethane bond may intervene between $R^5$ and $R^6$ and/or in a carbon-carbon bond in $R^6$, and a hydrogen atom in $R^6$ may be substituted by a halogen atom or a substituent group containing group $R^5$, and $R^1$, $R^2$ and m are as defined above.

2. The composition of claim 1 wherein component (A) is an organosilicon compound having the general formula (4):

[Chem. 3]

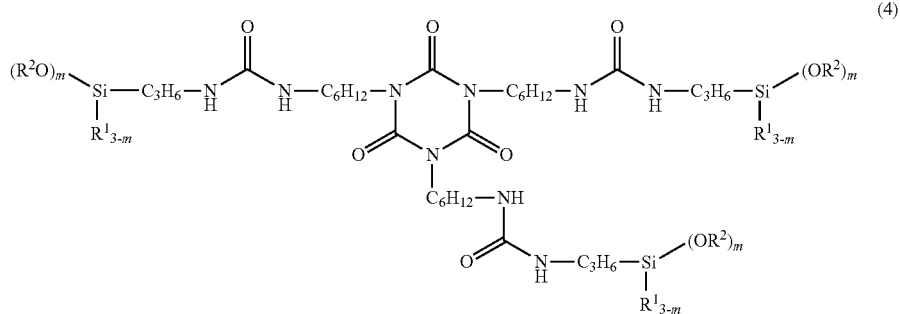

wherein $R^1$, $R^2$, and m are as defined above.

3. The composition of claim 1 or 2 wherein component (B) is present in an amount of 1 to 100 parts by weight.

4. The composition of claim 1 or 2, having a melting point of at least 40° C.

5. A coating composition comprising the composition of claim 1 or 2.

6. An adhesive comprising the composition of claim 1 or 2.

\* \* \* \* \*